(12) United States Patent
Zhang et al.

(10) Patent No.: US 10,901,983 B2
(45) Date of Patent: Jan. 26, 2021

(54) SYSTEM AND METHOD FOR UNIVERSAL BLOCKCHAIN INTEROPERABILITY

(71) Applicant: Wanchain Ltd., Austin, TX (US)

(72) Inventors: Weijia Zhang, Austin, TX (US); Xujun Lu, Austin, TX (US)

(73) Assignee: Wanchain Ltd., Austin, TX (US)

( * ) Notice: Subject to any disclaimer, the term of this patent is extended or adjusted under 35 U.S.C. 154(b) by 216 days.

(21) Appl. No.: 16/290,475

(22) Filed: Mar. 1, 2019

(65) Prior Publication Data
US 2020/0278958 A1    Sep. 3, 2020

(51) Int. Cl.
| | |
|---|---|
| G06F 16/00 | (2019.01) |
| G06F 16/23 | (2019.01) |
| G06F 16/27 | (2019.01) |
| G06Q 20/40 | (2012.01) |
| G06F 9/54 | (2006.01) |

(52) U.S. Cl.
CPC .......... *G06F 16/2379* (2019.01); *G06F 9/547* (2013.01); *G06F 16/27* (2019.01); *G06Q 20/401* (2013.01); *G06Q 2220/00* (2013.01)

(58) Field of Classification Search
CPC ............................ G06F 16/2379; G06F 16/27
See application file for complete search history.

(56) References Cited

U.S. PATENT DOCUMENTS

| | | | | |
|---|---|---|---|---|
| 2019/0172026 A1* | 6/2019 | Vessenes | ............... | H04L 9/3247 |
| 2019/0253263 A1* | 8/2019 | Qiu | ......... | H04L 63/102 |
| 2019/0305935 A1* | 10/2019 | Qiu | ......... | H04L 9/0637 |
| 2019/0340267 A1* | 11/2019 | Vo | ........ | G06F 16/2365 |
| 2020/0175003 A1* | 6/2020 | Jiang | ........ | G06F 16/2365 |
| 2020/0252202 A1* | 8/2020 | Madl | .......... | G06F 21/6218 |

* cited by examiner

*Primary Examiner* — Khanh B Pham
(74) *Attorney, Agent, or Firm* — Timothy T. Wang; Ni, Wang & Massand, PLLC (57) ABSTRACT

A method of blockchain cross-chain transaction, including at least one of constructing a generic transaction payload based on collected user input, sending the generic transaction payload to an API gateway, checking a generic transaction payload type to determine if it is one of a cross-chain transaction and a native transaction, receiving a bridge link if the generic transaction payload type is the cross-chain transaction, sending the cross-chain transaction to the bridge link, processing the cross-chain transaction, parsing a blockchain id if the generic transaction payload type is the native transaction, identifying a running blockchain node of the parsed blockchain id and sending the native transaction to blockchain to execute at least one of an on-chain transfer, an on-change exchange and an on-chain operation.

19 Claims, 13 Drawing Sheets

SYSTEM AND METHOD FOR UNIVERSAL BLOCKCHAIN INTEROPERABILITY

BACKGROUND

Technical Field

The instant disclosure is related to blockchains and specifically to enabling blockchains to function with interoperability.

Background

A blockchain is a distributed, decentralized, and immutable ledger that may be used for recording virtual currencies, tokens, transactions, events, and other data of value. With the success of Bitcoin, various blockchains such as Ethereum, EOS, Ripple. Litcoin, Wanchain and the like have been developed and are growing at a fast pace. There are also other private and consortium blockchains such as Hyperledger, Steller, Corda, or Quorum that only allow nodes with permitted identities to join the blockchain network. The growth of public and private blockchains impose challenges for inter-chain interoperability, particularly when these chains are heterogeneous and incompatible.

The instant disclosure proposes solutions to connect blockchains with common components and protocols, hence enables multi-asset wallet and explorer to be utilized to manage and browse digital assets in multiple blockchains.

SUMMARY

An example method of blockchain cross-chain transaction, including at least one of constructing a generic transaction payload based on collected user input, sending the generic transaction payload to an application programming interface (API) gateway, checking a generic transaction payload type to determine if it is one of a cross-chain transaction and a native transaction, receiving a bridge link if the generic transaction payload type is the cross-chain transaction, sending the cross-chain transaction to the bridge link, processing the cross-chain transaction, parsing a blockchain id if the generic transaction payload type is the native transaction, identifying a running blockchain node of the parsed blockchain id and sending the native transaction to blockchain to execute at least one of an on-chain transfer, an on-chain exchange and an alternative on-chain operation.

Another example method of processing a cross-chain transaction by a bridge, including at least one of receiving by the bridge a cross-chain transaction, parsing the cross-chain transaction, validating the cross-chain transaction based on a simulation of the cross-chain transaction, marking a cross-transaction error if the validation of the cross-chain transaction fails, sending a next cross-chain transaction after marking the cross-transaction error, synchronizing a bridge link registry with at least one other bridge if the validation of the cross-chain transaction passes, checking a status of the cross-chain transaction in the bridge link registry, locking the cross-chain transaction if the bridge link registry indicates that the cross-chain transaction is not in the bridge link registry, marking a cross-chain transaction confirmation if the locked cross-chain transaction is in the bridge link registry, receiving a next cross-chain transaction after marking the cross-transaction confirmation, sending a cross-chain transaction lock request if the cross-chain transaction is not in the bridge link registry, checking the cross-chain transaction status of the cross-chain transaction lock request in the bridge link registry, marking the cross-chain transaction as locked if the cross-chain transaction request status check passes, processing the locked cross-chain transaction and marking the cross-chain transaction as lock pending if the cross-chain transaction status fails.

A further example method of initiating a cross-chain bridge, including at least one of configuring the cross-chain bridge, starting a bridge instance for the cross-chain bridge, connecting to a bridge network, receiving a bridge registry from the bridge network, matching bridge types between the cross-chain bridge and the bridge network, joining a bridge link based on the matched bridge types, updating the bridge registry with the joined bridge link and synchronizing the bridge link with the joined bridge link.

DETAILED DESCRIPTION OF THE INVENTION

The embodiments listed below are written only to illustrate the applications of this apparatus and method, not to limit the scope. The equivalent form of modifications towards this apparatus and method shall be categorized as within the scope of the claims.

Certain terms are used throughout the following description and claims to refer to particular system components. As one skilled in the art will appreciate, different companies may refer to a component and/or method by different names. This document does not intend to distinguish between components and/or methods that differ in name but not in function.

In the following discussion and in the claims, the terms "including" and "comprising" are used in an open-ended fashion, and thus may be interpreted to mean "including, but not limited to . . . ." Also, the term "couple" or "couples" is intended to mean either an indirect or direct connection. Thus, if a first device couples to a second device that connection may be through a direct connection or through an indirect connection via other devices and connections.

The instant disclosure describes in part the following:

A proof of stake (POS) consensus algorithm: Consensus is a key component in blockchain to ensure that block transaction and new blocks are agreed upon by the participating nodes in a blockchain. Bitcoin and Ethereum use proof of work (POW) consensus in which a block proposer is chosen when a calculated hash matches a predefined hash in a block. With respect to POWs, the larger the CPU computational power, the higher the probability of finding a match of hash. Hence it is compute-intensive and increases the barrier for malicious nodes to take over the network. Ethereum is now moving to a POS (Proof of Stake) consensus algorithm in which a participating node's probability to be selected as block proposer is proportional to the number of assets set aside (staking) for the mining operation. There are different kinds of Proof of Staking algorithms such as Ethereum POS, Cardano POS, QTUM, NEO, WanPOS and the like. The disclosed POS may be used in converting native coins to tokens with a lock time and associating a probability of block leader selection with the lock time.

A multi-bridge mechanism is through one plural component nodes that are used to listen to events on multiple blockchains and processes and relays the transaction to the corresponding blockchains. A bridge node may have multiple running programs to form a cluster and each shares part of the secret for unlocking the accounts that stage the cross-chain values. The multi-bridge mechanism will support staking that allows users to lock a portion of their assets through a smart contract to fund the running node and receive a reward for the cross-chain transaction.

Mobile wallet support: Besides a desktop wallet and web wallet, a mobile wallet allows users to view, store, transfer, and pay virtual currencies. Since current mobile wallet has limited storage space, limited screen size and limited computing power, it is not feasible to provide an application that connects to multiple blockchains in a single device and application. Thus, what is disclosed are new systems and applications that support nearly instantaneous cross-chain transactions.

Universal Cross-chain Support: The system and method disclosed may provide a possible solution to connect any homogeneous and heterogeneous blockchain. This is achieved by generalizing the disclosed multi-bridge mechanism and cross-chain technology.

Currently there is no known mobile device that has embedded features to perform cross-chain transactions. There is no single wallet that may be used to deposit virtual currency to an account and use it for staking and receiving a reward based on cross-chain transactions. Furthermore, there is no single wallet that may be used to perform cross-chain staking to deposit a virtual currency from one blockchain to be a stake for another blockchain. And finally, there is no generic mechanism for connecting blockchains for interoperability.

The instant application discloses a generic system and method for universal cross-chain interoperability that allows client devices to send generic transactions to a native blockchain or a bridge link to multiple blockchains. A bridge link contains multiple bridges that may process cross-chain transactions. Multiple bridges are connected through a network and synchronize on bridge link registry or a common message mechanism to achieve decentralization of cross-chain transaction processing.

The instant disclosure proposes a possible solution for multi-asset wallet with features of payment, data, and value transfer and staking based on universal cross-chain bridge link.

The instant disclosure proposes a possible solution for blockchain interoperability including an all in one wallet that has embedded security with built-in hardware keys, an asset transfer system, a nearly instantaneous transfer of assets, a virtual currency payment system, a built-in cross-chain transfer system, a built-in staking mechanism, a modified POS consensus, a built-in cross-chain staking mechanism, a bridge link with one or more bridges, a mechanism to synchronize bridge link registry for bridges and a consensus for bridges to process cross-chain transactions.

Multi-Bridge Consensus:

Two homogeneous or heterogeneous blockchains are connected with a bridge link composed of multiple bridges.

A bridge contains a port that connects to the first blockchain and a second port connecting a second blockchain. The bridge also contains service agents and local bridge registry to store cross-chain transaction information.

The local bridge registries may be synchronized to share the same data among various bridges.

One or more bridges may process the cross-chain transactions and share status among bridges.

Through multi-bridge consensus, cross-chain transactions may be processed and confirmed by one or many of the bridges in the bridge link hence achieve decentralization.

In the cross-chain staking mechanism, cross-chains have their own stakes independent of the total assets of the main chain, when users attempt to stake their asset, it needs to assign a cross-chain as staking target, the staking account may be rewarded when there are transactions for the corresponding blockchain and the wallet has a built-in connection to an API gateway and has staking interfaces.

Figure 1:
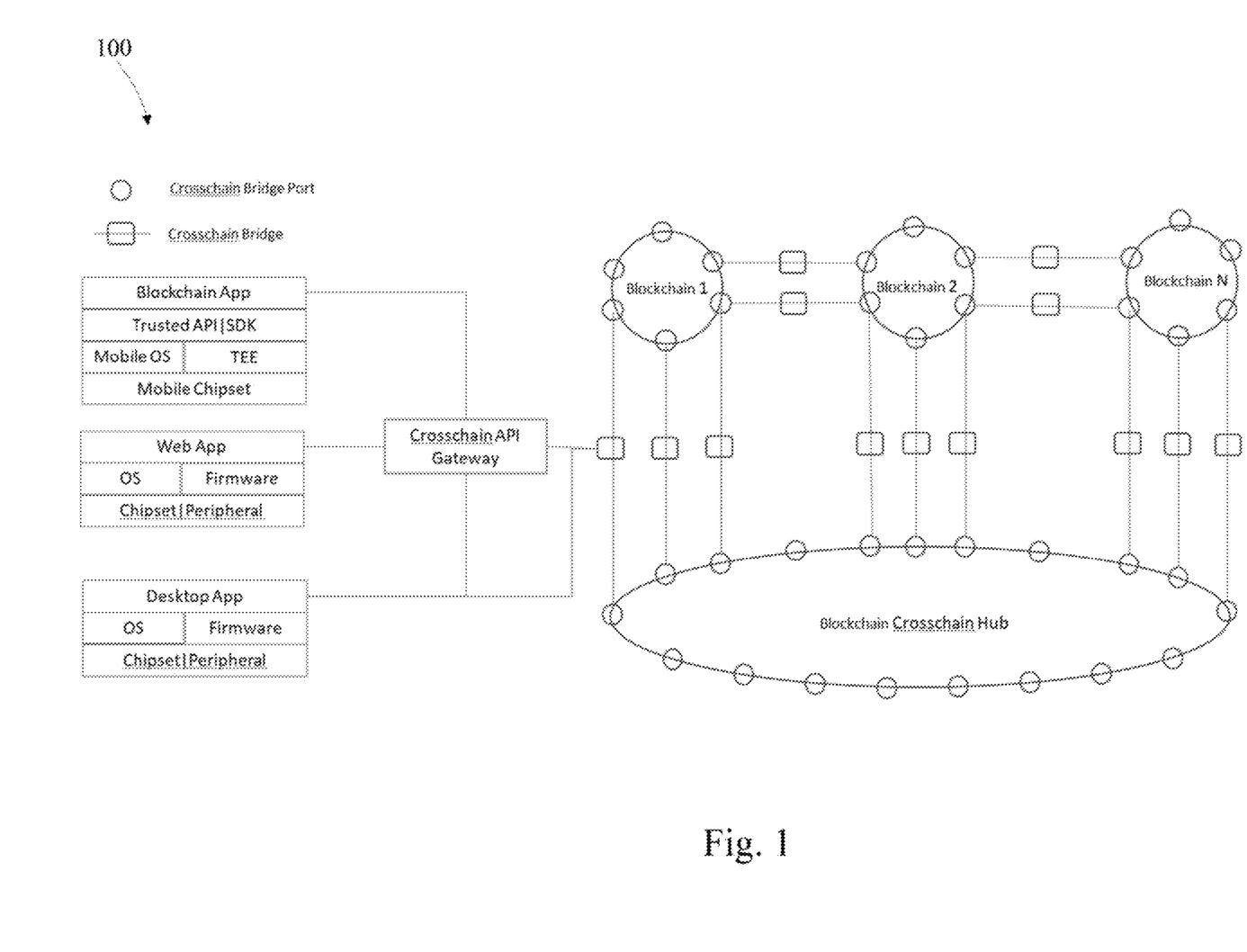
FIG. 1 is an example overview of cross-chain components with blockchain interoperability in accordance with one embodiment of the disclosure.

FIG. 1 depicts an example cross-chain system containing the following components: a) set client devices such as a handheld mobile device, a device having a web browser, or a desktop with applications; b) a cross-chain API gateway that is connected to client devices and various blockchains, bridge links and blockchain hubs; c) homogenous or heterogeneous blockchains; and d) universal cross-chain bridges or bridge links that connect blockchains to provide native or cross-chain transactions.

The handheld client device in FIG. 1 comprises a chipset and mobile operating system. The operating system therein can support a separate trusted execution environment to ensure that the execution of wallet private key access and transaction processing is isolated from other user programs. The trusted execution environment is accessed through an API to connect to a blockchain program such as an asset wallet.

Cross-chain API gateways may be implemented with different technologies. For example, an API gateway may have an HTTP server as a front end that communicates with client devices. In another embodiment, the API gateway may have a peer to peer connection with a client device and receives messages from the clients. The API gateway may also implement a load balancing server to increase the scalability and reliability of the gateway. The backend of the API gateway connects to native blockchains, bridge links, or blockchain hubs. A native blockchain is a blockchain that supports single chain and protocol, such as bitcoin, Ethereum, Quorum, EOS, Tron, corda, ripple, and hyperledger. A blockchain hub is a blockchain that has functions to perform cross-chain operations to transfer and aggregate assets, data, value across blockchains. Blockchains such as Wanchain, Polkadot, and Cosmos may be classified as blockchain hub.

In this architectural diagram, blockchain bridges and bridge links are shown. A blockchain bridge is a connector that connects two homogeneous or heterogeneous blockchains to allow flow of data, value, assets, and operations. A bridge link is a set of bridges that are interconnected to provide redundancy and decentralization for the cross-chain operations between two blockchains. A blockchain bridge link is further explained in the following figures.

Figure 2:
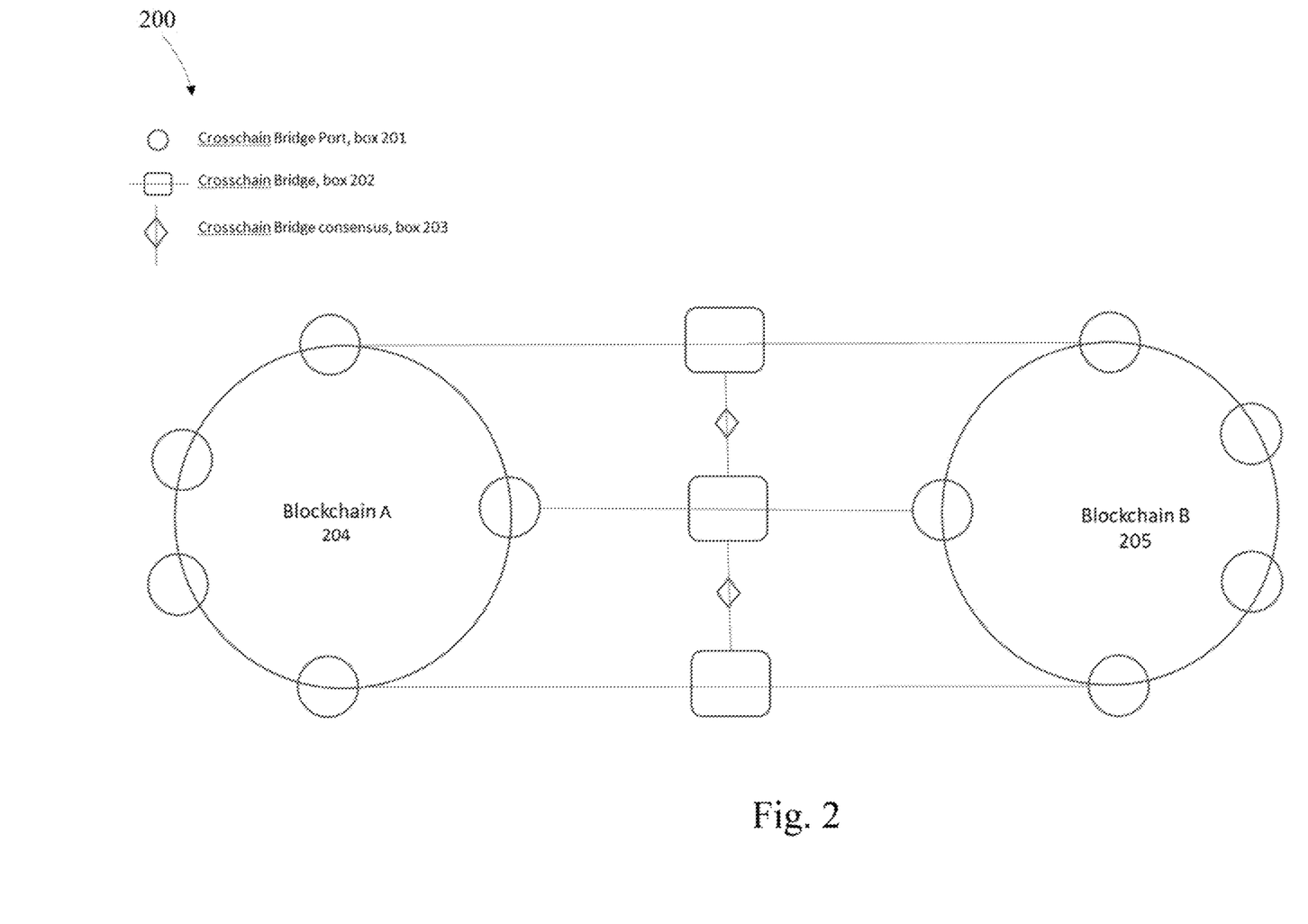
FIG. 2 is an example schematic diagram of heterogeneous cross-chain bridging with inter-bridge consensus in accordance with one embodiment of the disclosure.

FIG. 2 is an example schematic diagram depicting a bridge link connecting two different blockchains. Box 204 is a generic blockchain and box 205 is another generic blockchain. A generic blockchain may be a native blockchain or a blockchain hub as mentioned in FIG. 1 description. Box 204 and 205 are connected through box 202 of a cross-chain bridge. A cross-chain bridge has a port (box 201) that serves as an adaptor for the bridge and a blockchain. A port may have a component on box 204 and companion component on the bridge. The two components in a port share the data and operations between a bridge and a blockchain.

Multiple bridges are connected through box 203 defined as a cross-chain bridge consensus component. This component that provides inter-bridge network connections contains local and decentralized storage, and a mechanism to synchronize messages and data, and an algorithm to determine which bridges are responsible for performing and confirming the cross-chain transactions.

Figure 3:
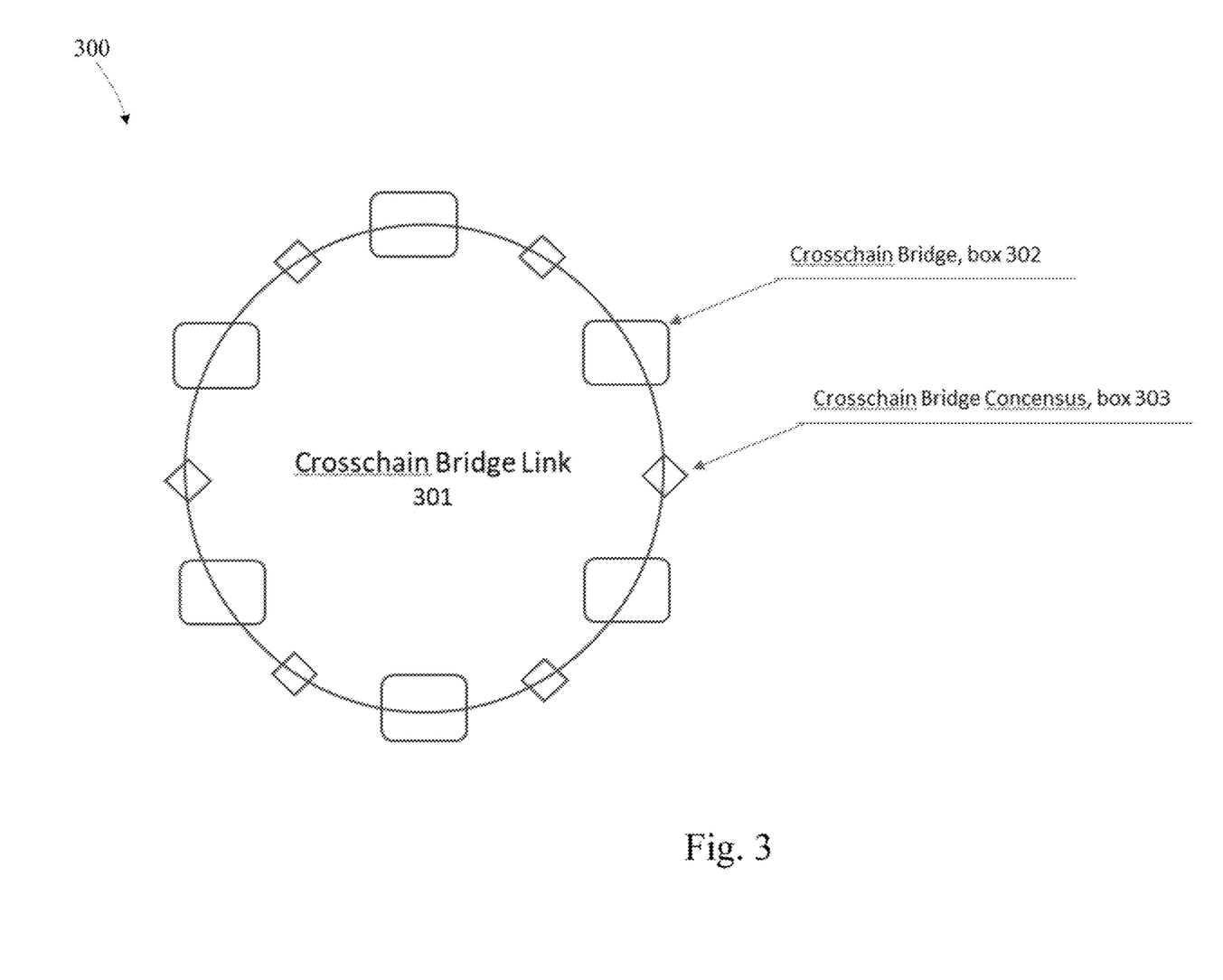
FIG. 3 is an example schematic diagram of a cross-chain bridge link with inter-bridge connection and consensus in accordance with one embodiment of the disclosure.

An example bridge link is further depicted in FIG. 3. A cross-chain bridge link in box 301 is composed of bridges in box 302 connected through cross-chain bridge consensus component of box 303. The bridges are interconnected to form a permission loop in which only registered bridge may become a member of a bridge link. Only bridges in the loop may perform cross-chain operations for the two blockchains connected through a bridge link.

Figure 4:
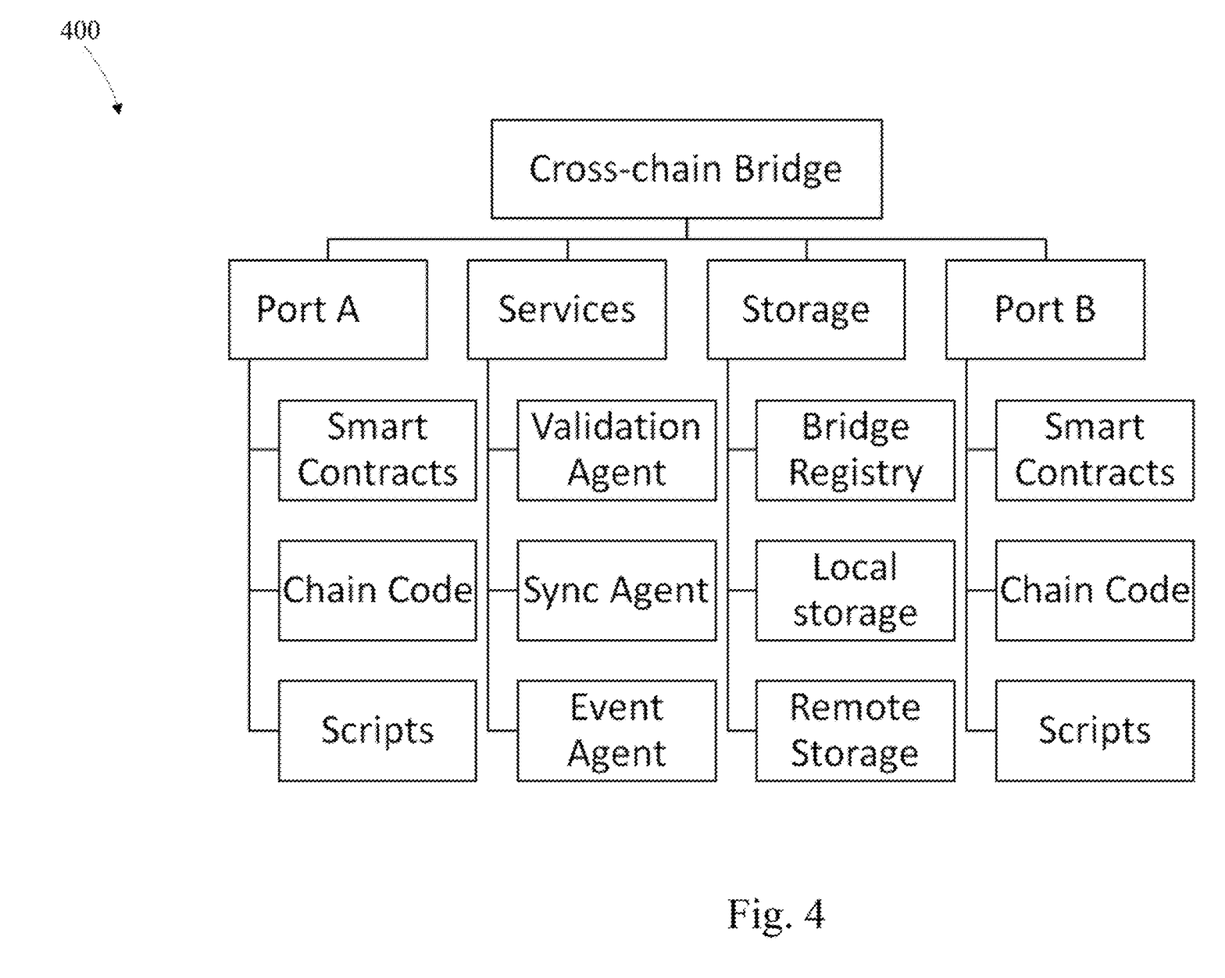
FIG. 4 is an example architectural overview of components of a cross-chain bridge in accordance with one embodiment of the disclosure.

FIG. 4 further depicts example components of a cross-chain bridge. A cross-chain bridge may have two or more ports, connecting to corresponding blockchains. A port may contain executable codes such as smart contracts, chain code, or scripts that may be used to perform operations on a blockchain to which it is attached. The executable code then transfers the operation and data to the bridge for further processing through the services in the cross-chain bridge. These services may include a validation agent to validate a cross-chain transaction, a sync agent to synchronize data and state among bridges, an event agent to listen and process events. A cross-chain agent may also contain storages such as bridge registry that records bridge information and state, and other local or remote storage to store processing data.

Figure 5:
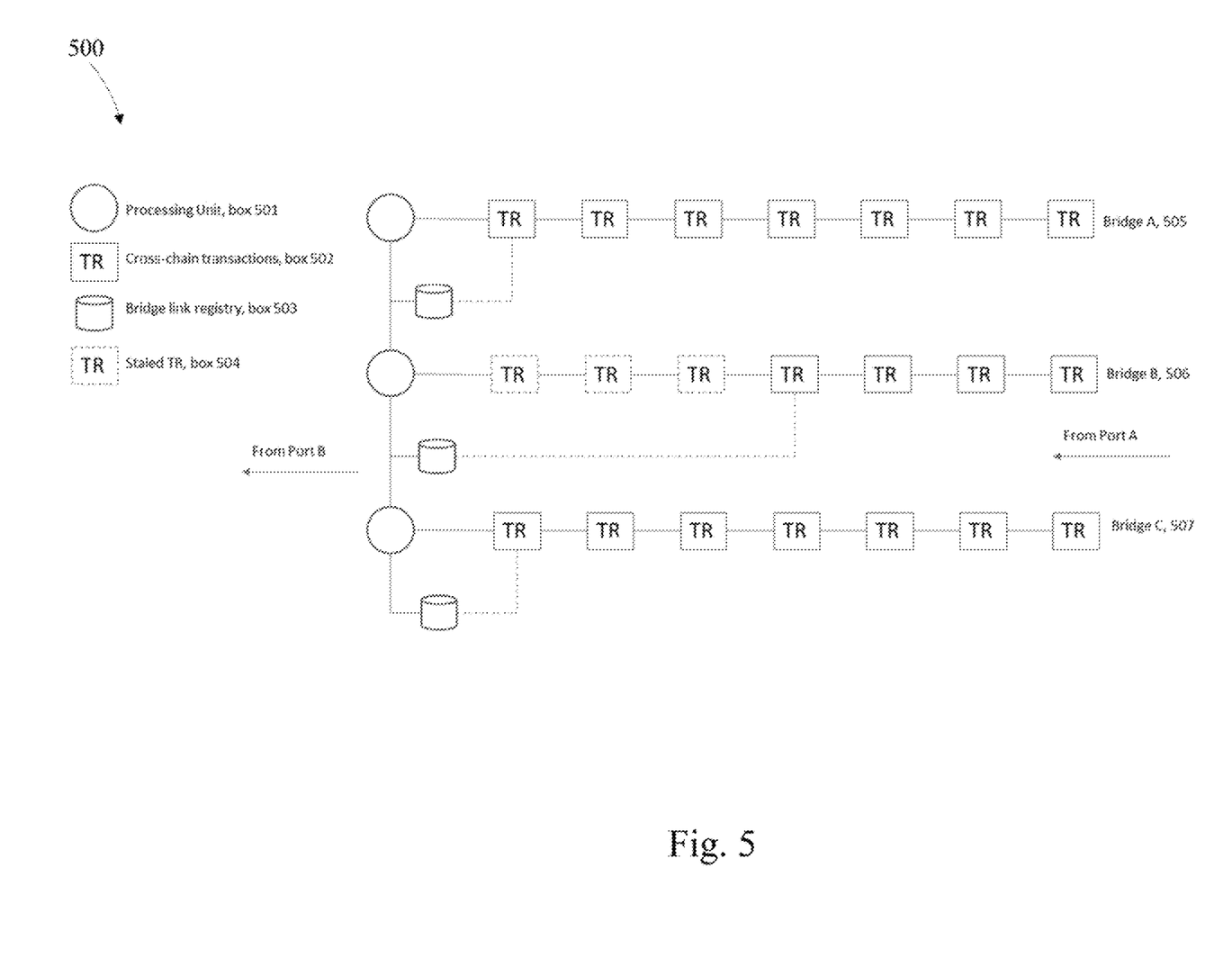
FIG. 5 is an example schematic diagram of a cross-chain transaction with inter-bridge connections and multi-bridge consensus in accordance with one embodiment of the disclosure.

FIG. 5 depicts an example of how cross-chain transactions may be processed through inter-bridge connections and multi-bridge consensus. In this diagram, the inter-bridge connection is a bridge link with bridge A, B, C of box 505, 506, and 507 connected to one another. Bridges may independently receive and process cross-chain transaction depicted as box 502 through processing unit of box 501. Each bridge also contains a bridge link registry depicted as box 503 that may be synchronized to maintain consistent data and state for different bridges in the link. When a cross-chain transaction is processed, the result is compared and recorded in the link registry. If a pending transaction for a bridge is processed by another bridge, its state in the pending transaction queue becomes staled and should be removed from the pending queue so that the next transaction may be processed.

Figure 6:
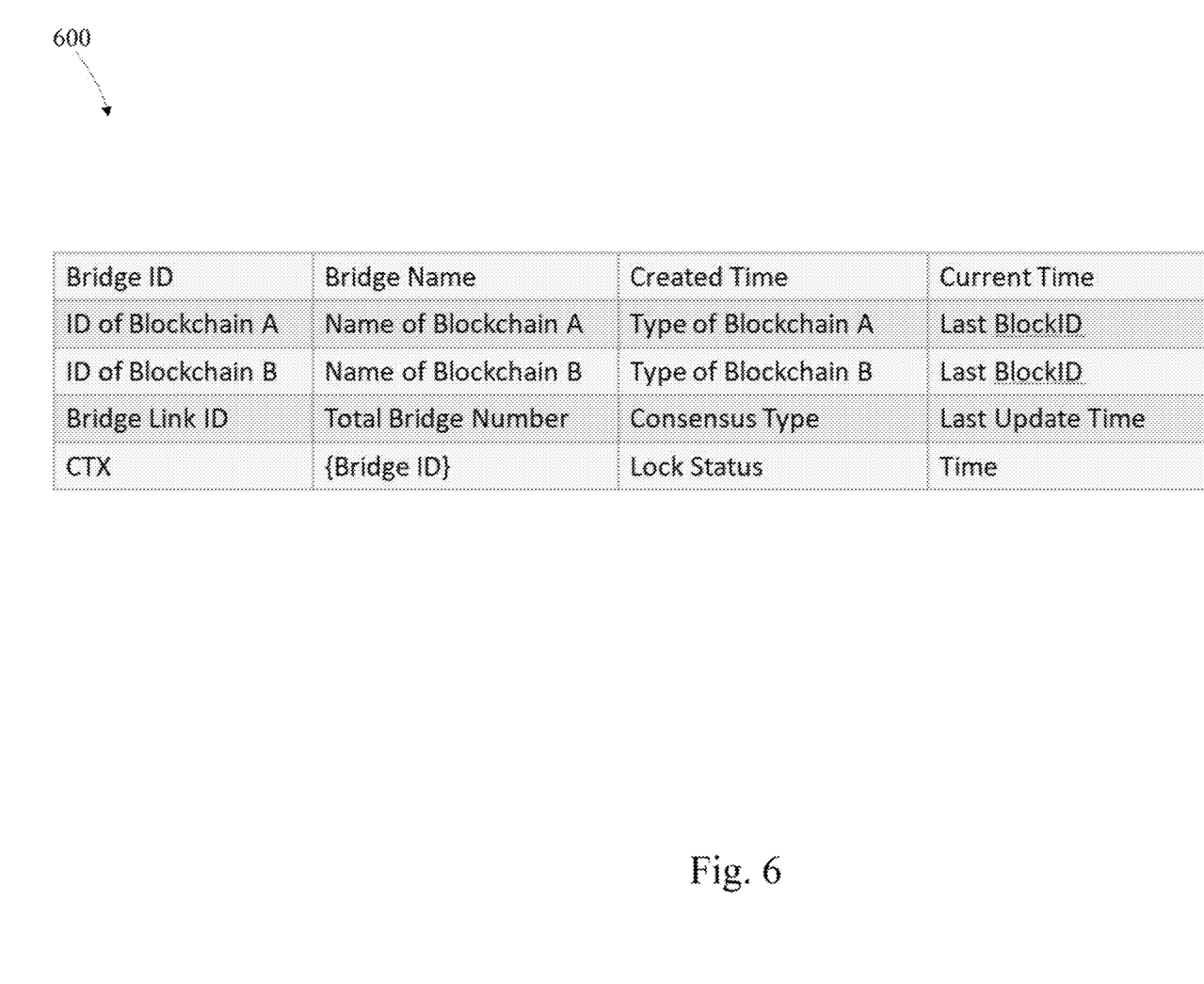
FIG. 6 is an example overview of data and components of a cross-chain bridge link registry in accordance with one embodiment of the disclosure.

A bridge link registry is further depicted in FIG. 6 to show the major data structure and parameters for the registry. The registry contains a bridge id to uniquely identify a bridge. The registry also contains bridge name, created time of the bridge, and the current time of the bridge clock. The bridge registry also contains id, name, type, and the latest block id for the blockchains connected to the bridge. It may also contain information about the bridge link id, name, consensus type, and last update time when the registry is updated with addition or removal of the bridges. The registry may also contain a list of pending cross-chain transactions with their lock status and the transaction updated time.

Figure 7:
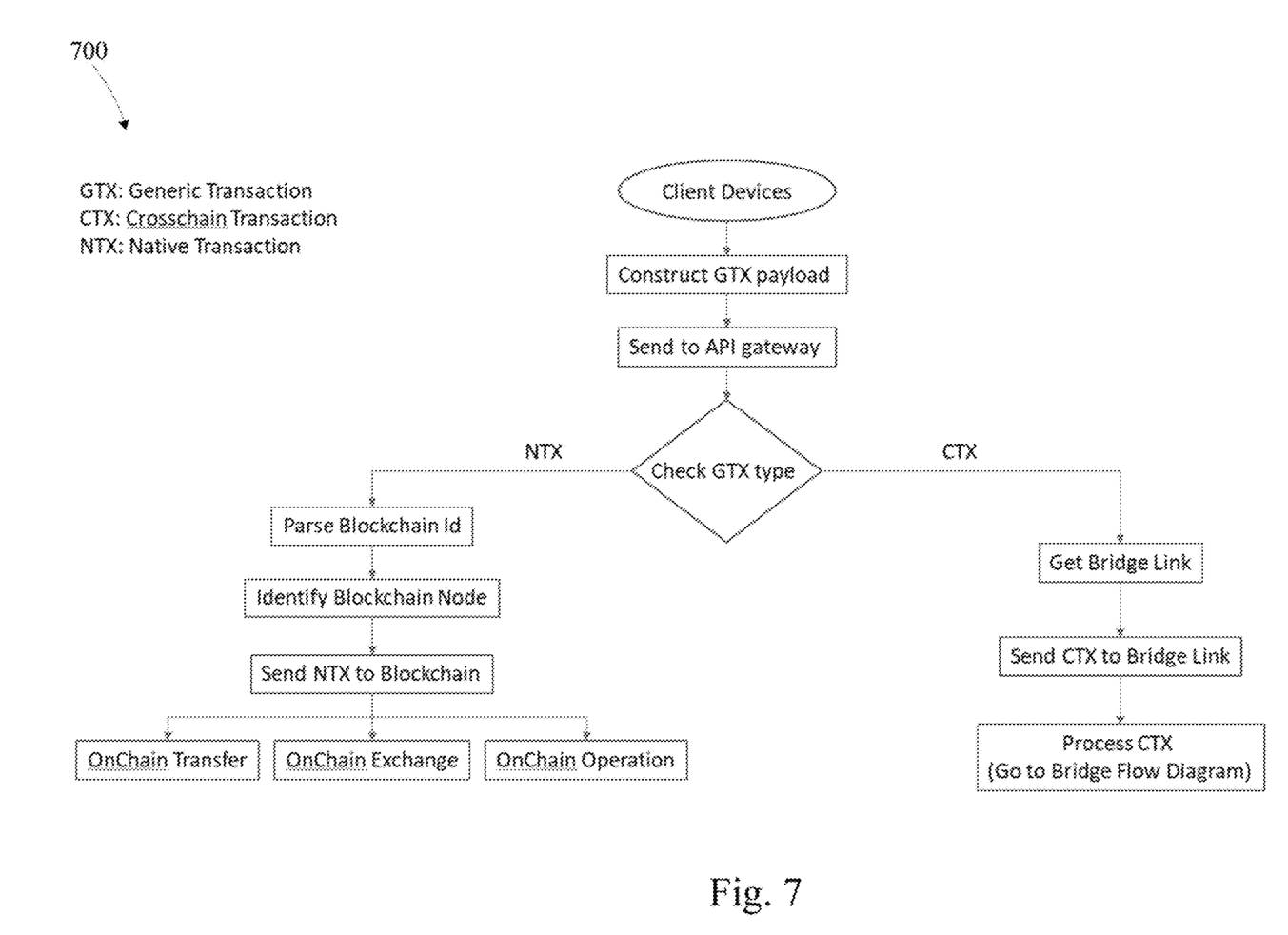
FIG. 7 is an example workflow of a blockchain cross-chain transaction in accordance with one embodiment of the disclosure.

An example workflow of cross-chain transactions is depicted in FIG. 7. Client devices collect user input and construct a Generic transaction (GTX) payload. This payload contains information such as a) source blockchain id where the operation is originated and destination blockchain id where the operation is expected to occur; b) respective account addresses; c) corresponding gas fees; d) bridge link identifier; e) transaction and operation types; and f) other miscellaneous information. The GTX payload is sent to an API gateway where the GTX type is checked to determine if this is a native transaction (NTX) or a cross-chain transaction (CTX). In the case of an NTX transaction, the transaction payload is parsed to obtain the blockchain id and to identify a running blockchain node. Then the NTX payload is sent to the corresponding blockchain with matching blockchain id. In that blockchain, the transaction is processed based on the operation types such as on-chain transfer, exchange, payment, or other operations. In the case of the cross-chain transaction (CTX), the API gateway parses the CTX to acquire the bridge link and then send CTX to bridge link. Bridges in the bridge link will receive the CTX payload and put the CTX payload into the corresponding bridge pending transaction queue for further processing.

Figure 8:
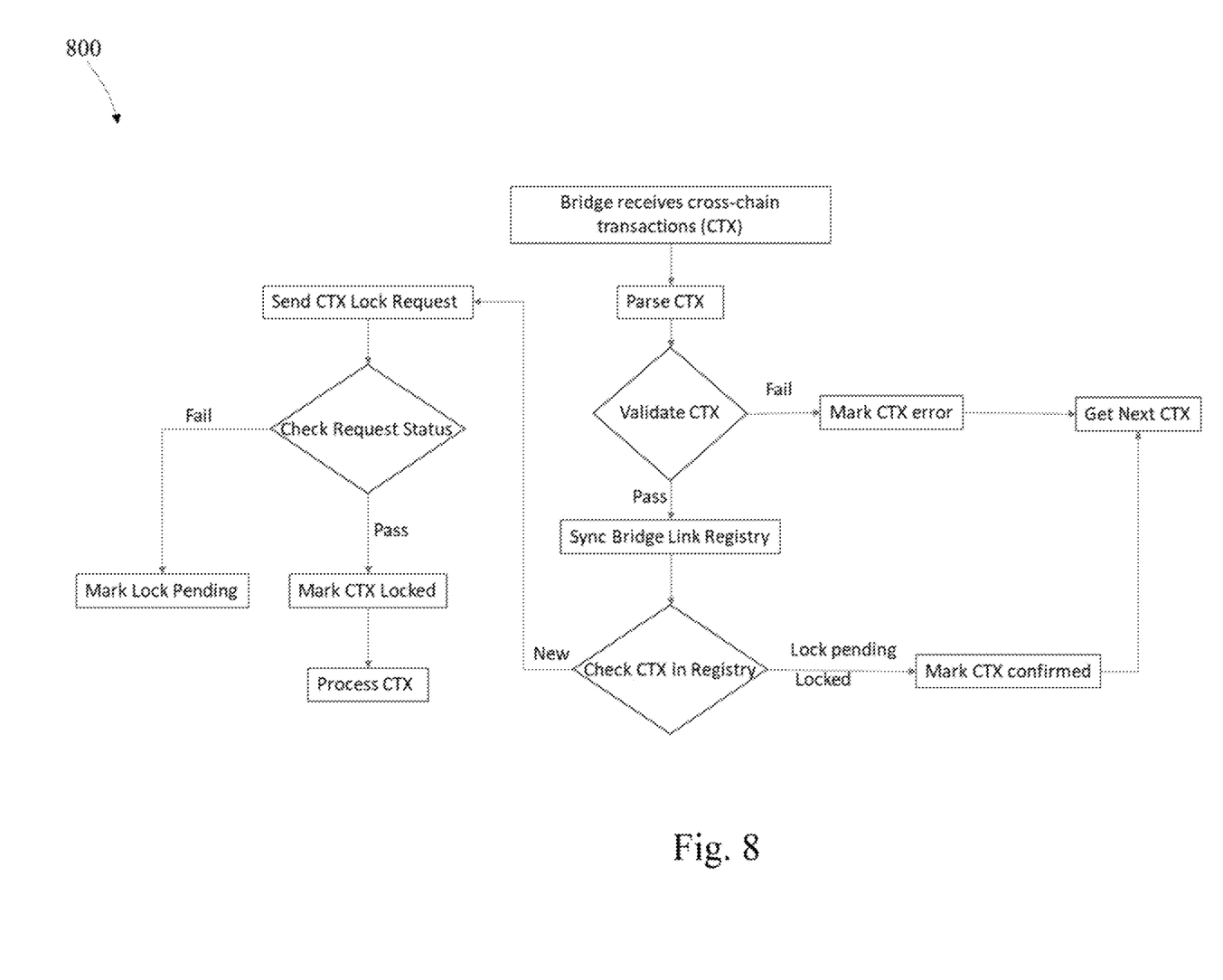
FIG. 8 is an example workflow of a cross-chain transaction processed by a bridge in accordance with one embodiment of the disclosure.

When a bridge in a bridge link receives the cross-chain transaction (CTX) package, it may process the package in an example workflow as shown in FIG. 8. The bridge will parse CTX and validate the package to ensure parameters such as blockchain id, accounts and balance, and transaction fees are correct. The validation may also simulate the transaction to ensure that the CTX is valid. If the CTX is not valid, an error message will be sent, and an error event logged. The bridge then proceeds to process the next CTX, whereas if a CTX is valid, the bridge will synchronize the link registry with other bridges. After syncing, the bridge may check the CTX for its status. If the CTX is in locked or lock pending status by other bridges, the bridge will add a confirmation to mark that the CTX is confirmed as validated. If the CTX is not in link registry, the bridge will send a lock request to the bridge link to lock and process the CTX. If the lock request fails, the bridge will mark the CTX as lock pending, whereas if the lock request succeeds, the bridge will mark the CTX as locked and start processing the operations in CTX.

Figure 9:
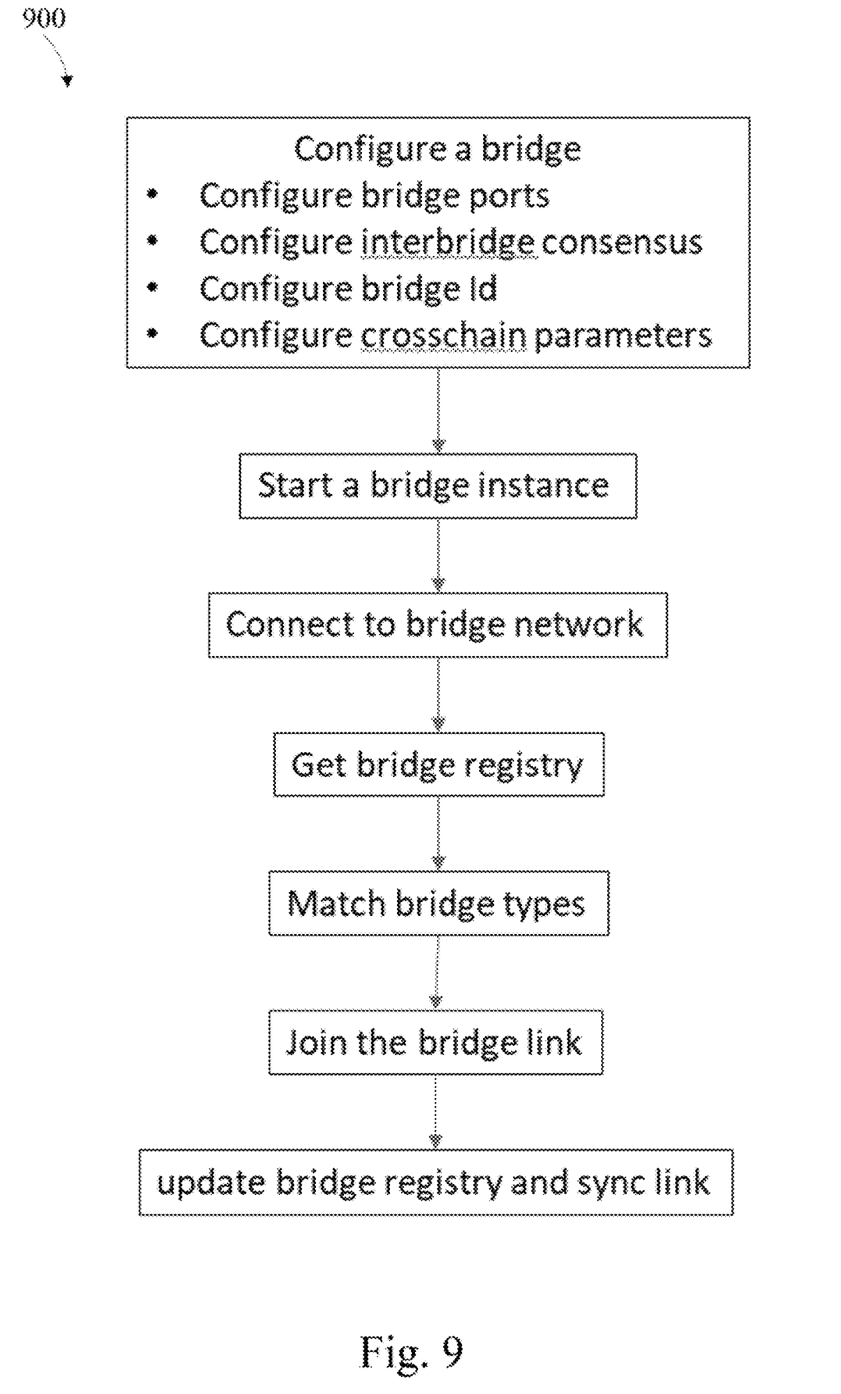
FIG. 9 is an example workflow of configuring and starting up a cross-chain bridge in accordance with one embodiment of the disclosure.

The cross-chain bridge described above is generic and may universally connect both homogeneous and heterogeneous blockchains. FIG. 9 depicts an example workflow of starting up a universal cross-chain bridge. A bridge may be implemented as one or more standalone programs running on dedicated hardware. The bridge may have a port that provides a connection to the first blockchain and another port connected to the second blockchain. To run a bridge, several parameters will need to be configured. The bridge port configuration task includes running agents or scripts on the native blockchains and configuring the communication between agents and scripts on the blockchain and the agents on the bridge. Another task configures the inter-bridge consensus. This configures the consensus algorithm so that different bridges may agree on the locking and processing of the cross-chain transactions. There are multiple consensuses that may be configured. For example, a system may have a first come first lock (FCFL) consensus in which the bridge that first submits the lock request will be chosen as the leader to process the CTX in this round. Another algorithm will be cross-chain bridge proof of stake (CBPOS) where the probability of being selected as the leader is proportional to the bridge fund that account owners deposit for a bridge. The bridges in a bridge link should share the same consensus. A bridge should also configure its bridge id and other blockchain parameters such as transaction fee ratio, link registry synchronization interval and the like. A bridge may obtain these parameters through the bridge registration process.

Once a bridge is configured, an instance of the bridge is started and connected to the bridge network. The bridge then acquires the bridge link registry and compares bridge setting with networked link registry to match the bridge types. Once there is a match the bridge joins the bridge link, updates the bridge registry and sends a synchronization message for other bridges to update their link registry. The bridge then becomes a member of the bridge link and may start processing cross-chain transactions.

Figure 10:
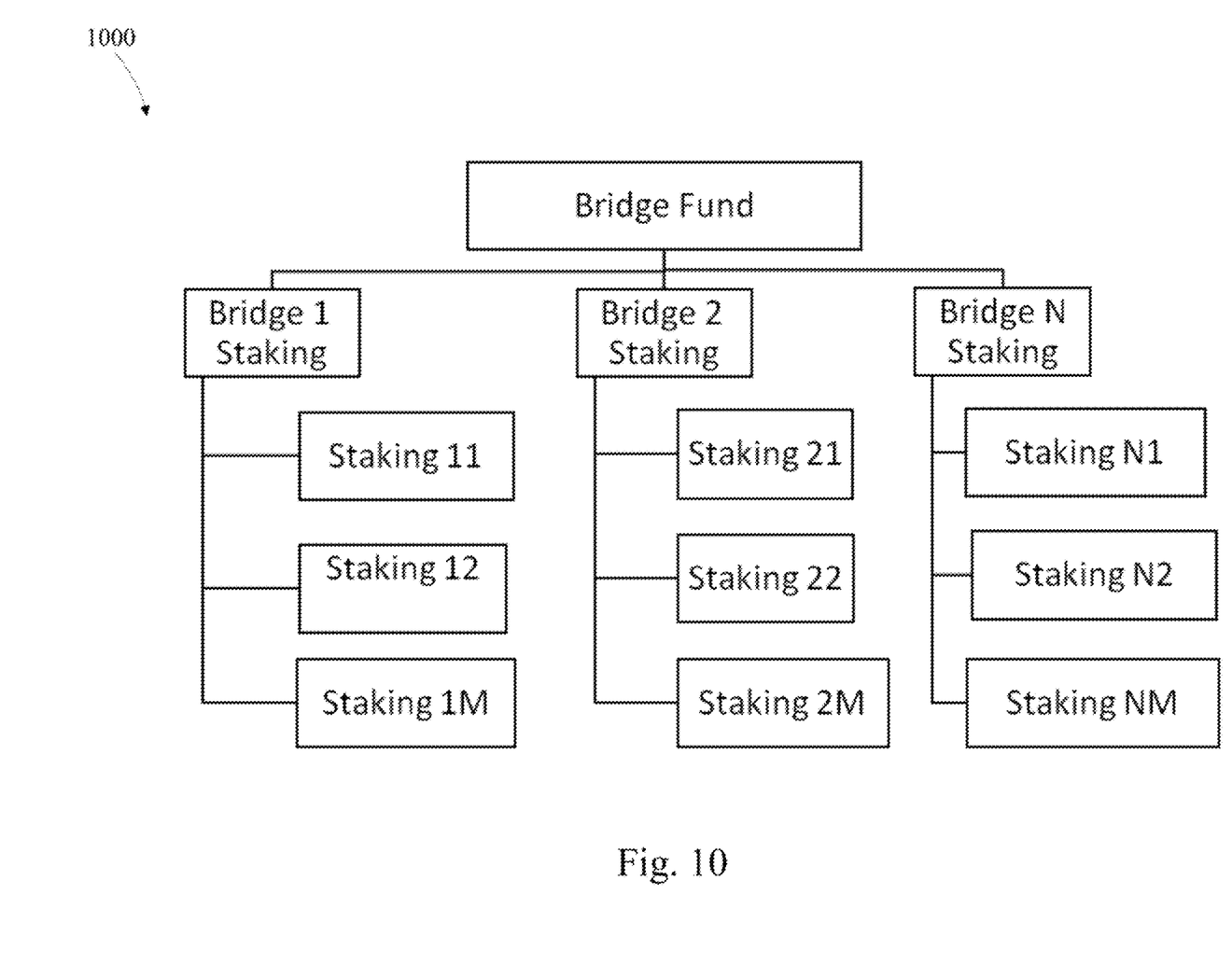
FIG. 10 is an example overview of a cross-chain bridge proof of stake for a bridge fund in accordance with one embodiment of the disclosure.

FIG. 10 illustrates an example overview of how a cross-chain bridge proof of stake (CBPOS) for a bridge fund.

In the CBPOS consensus mechanism, accounts in the blockchains may fund a bridge by locking a certain amount of assets in the blockchains in return for a reward of cross-chain transaction fees. This may be done by implementing smart contracts on a blockchain for a staking function such as the following, Stake deposit is a function of Blockchain id, account, amount, Bridge_id, duration and signatures, where Stake_deposit is a function for an account to deposit assets to fund a bridge, Blockchain_id represents a blockchain where the account is located, the account is a blockchain account from which a fund will be withdrawn or locked to support a bridge to process cross-chain transactions, the amount is the amount of the asset that will be deposited, Bridge_id represents the bridge for which the fund will be deposited, the duration is the length of time when the asset will be locked in the account and signature is a signed message from the account, owner to enhance the authenticity of the staking request.

Once account owners deposit their assets to the bridges, they accumulate stakes for the bridge fund. A bridge fund is the aggregation of the assets and value deposited to bridges in a bridge link. A bridge stake is a total stake deposited to a particulate bridge. A stake and an asset do not need to have a one-to-one matching relationship. For example, a stake may be a function of asset value with modifiers such as length of deposit time and other promotional factors such as deposit time or even a random lucky number. These multi-bridge stakes form the basis for selections of bridges for processing cross-chain transactions as well as the basis for rewards. In general, the larger the stake a bridge has, the more chance it has to be selected as a leader to process CTX. Similarly, the larger the stake an account has, the larger a portion of reward an account will receive. As shown below, a stake of asset deposit from account i to bridge j (Sij) is a function of the amount of asset (Aij), length of deposit time (Lij), and other factors Xij.

$$Sij=F(Aij,Lij,Xij)$$

A bridge stake is the sum of all assets of account i at bridge j.

A bridge fund is equal to the sum of all account stakes for a particular bridge.

Total bridge fund is equal to the sum of all Sij.

Total bridge fund can be calculated by summing up all stake Sij for account i to bridge j.

The probability of a bridge being selected as a leader to process CTX is equal to the bridge stake divided by the total bridge fund. It can be calculated as follows:

$$\text{Bridge selection probability}=\text{bridge stake } j(BSj)/\text{total bridge stake (TBS)}.$$

The reward for an account for the cross-chain transaction is equal to the total reward multiply with the corresponding account stake divided by the total bridge fund. It can be calculated as follows:

$$\text{Account Reward}=\text{Total\_Reward}*\text{Sum\_over\_}j/\text{total bridge stake (TBS)}.$$

Figure 11:
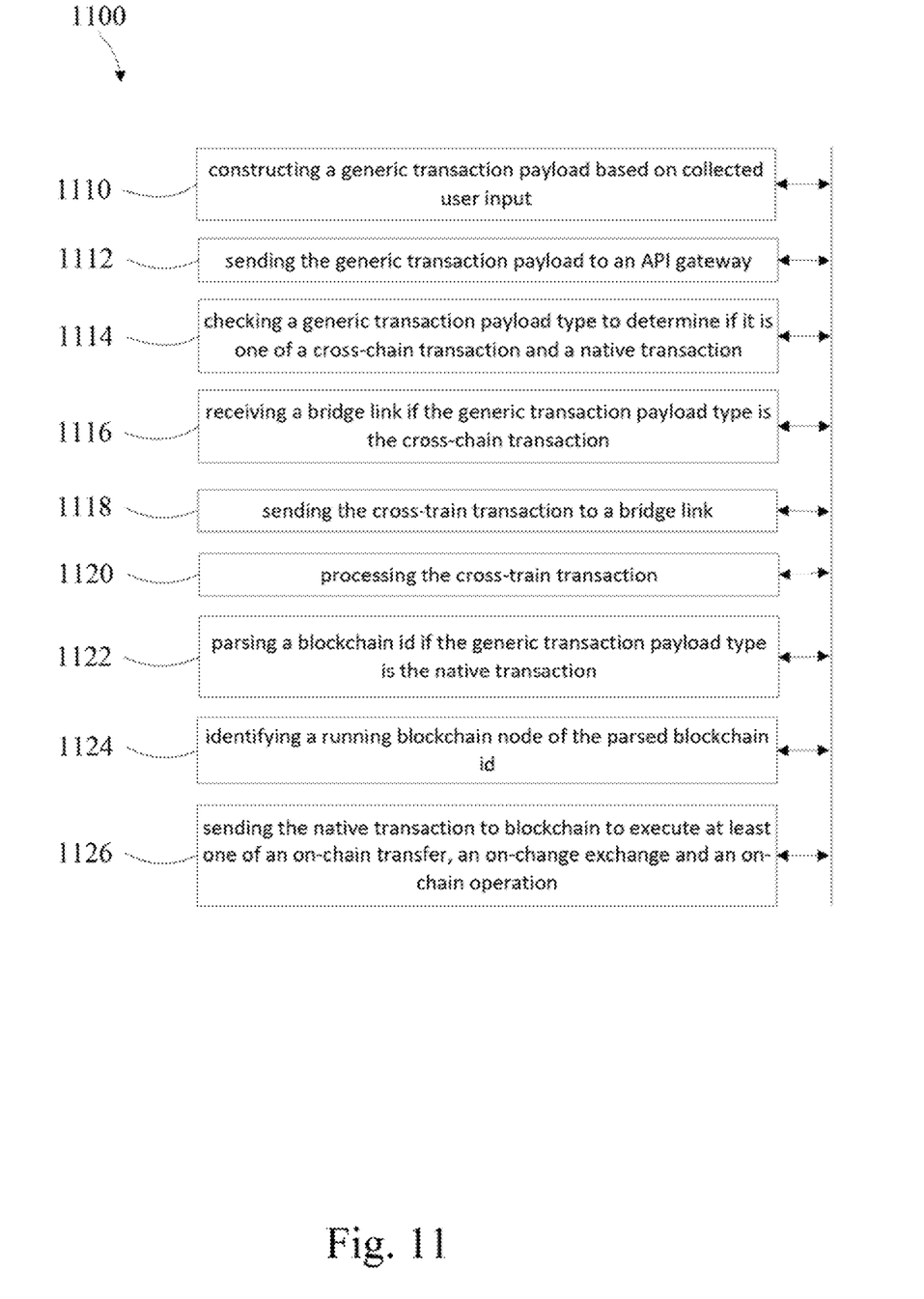
FIG. 11 is an example method of blockchain cross-chain transaction in accordance with one embodiment of the disclosure.

FIG. 11 depicts an example method of blockchain cross-chain transaction of FIG. 7, including constructing 1110 a generic transaction payload based on collected user input, sending 1112 the generic transaction payload to an API gateway, checking 1114 a generic transaction payload type to determine if it is one of a cross-chain transaction and a native transaction and receiving 1116 a bridge link if the generic transaction payload type is the cross-chain transaction. The method also includes sending 1118 the cross-chain transaction to the bridge link, processing 1120 the cross-chain transaction, parsing 1122 a blockchain id if the generic transaction payload type is the native transaction, identifying 1124 a running blockchain node of the parsed blockchain id and sending 1126 the native transaction to blockchain to execute at least one of an on-chain transfer, an on-change exchange and an on-chain operation.

Figure 12:
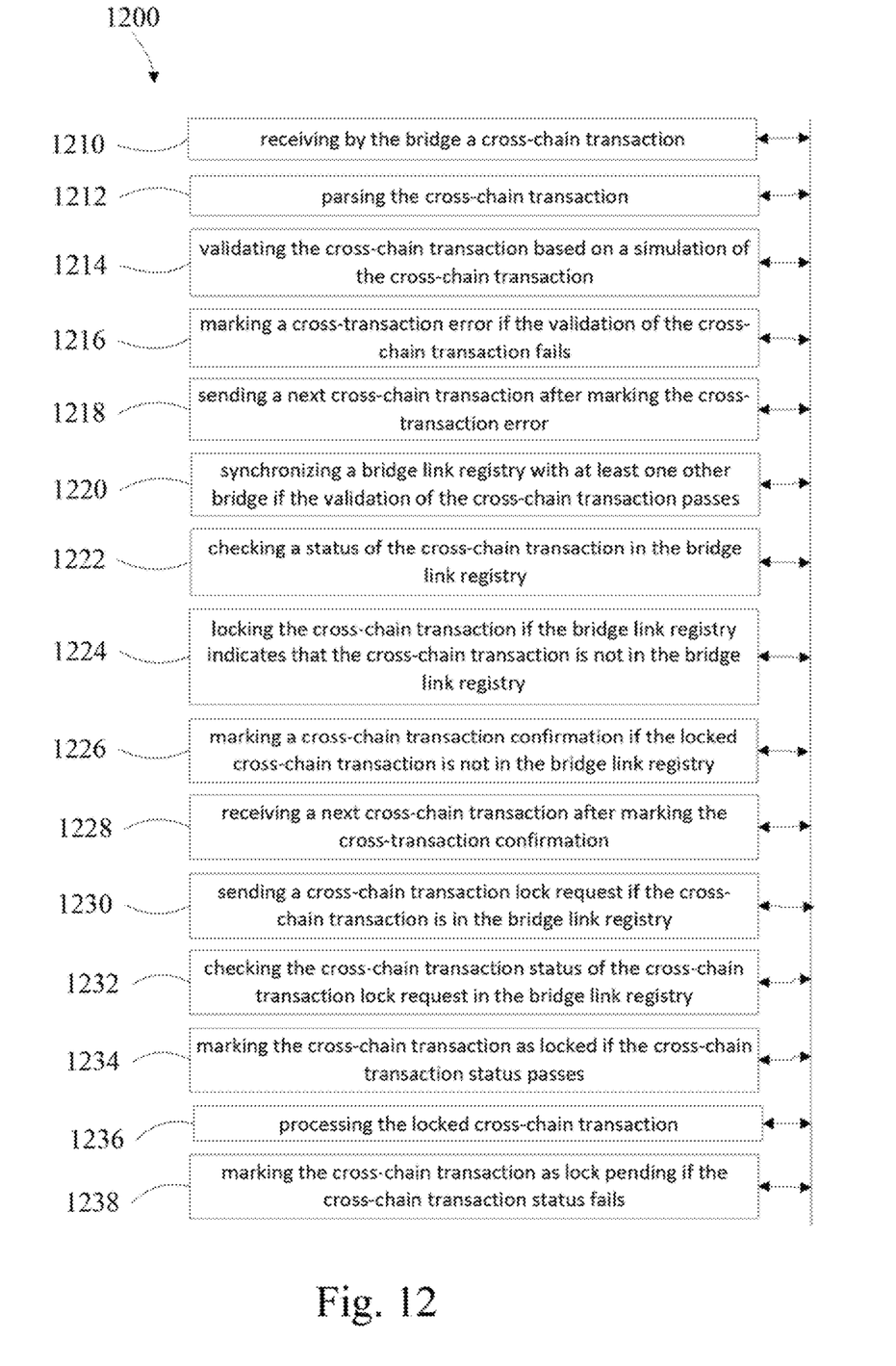
FIG. 12 is an example method of cross-chain transaction processed by a bridge in accordance with one embodiment of the disclosure.

FIG. 12 depicts an example method of processing a cross-chain transaction by a bridge of FIG. 8, including receiving 1210 by the bridge a cross-chain transaction and parsing 1212 the cross-chain transaction. The method includes validating 1214 the cross-chain transaction based on a simulation of the cross-chain transaction, marking 1216 a cross-transaction error if the validation of the cross-chain transaction fails, sending 1218 a next cross-chain transaction after marking the cross-transaction error and synchronizing 1220 a bridge link registry with at least one other bridge if the validation of the cross-chain transaction passes. The method further includes checking 1222 a status of the cross-chain transaction in the bridge link registry, locking 1224 the cross-chain transaction if the bridge link registry indicates that the cross-chain transaction is not in the bridge link registry, marking 1226 a cross-chain transaction confirmation if the locked cross-chain transaction is not in the bridge link registry and receiving 1228 a next cross-chain transaction after marking the cross-transaction confirmation. The method also includes sending 1230 a cross-chain transaction lock request if the cross-chain transaction is in the bridge link registry, checking 1232 the cross-chain transaction status of the cross-chain transaction lock request in the bridge link registry, marking 1234 the cross-chain transaction as locked if the cross-chain transaction status passes, processing 1236 the locked cross-chain transaction and marking 1238 the cross-chain transaction as lock pending if the cross-chain transaction status fails.

Figure 13:
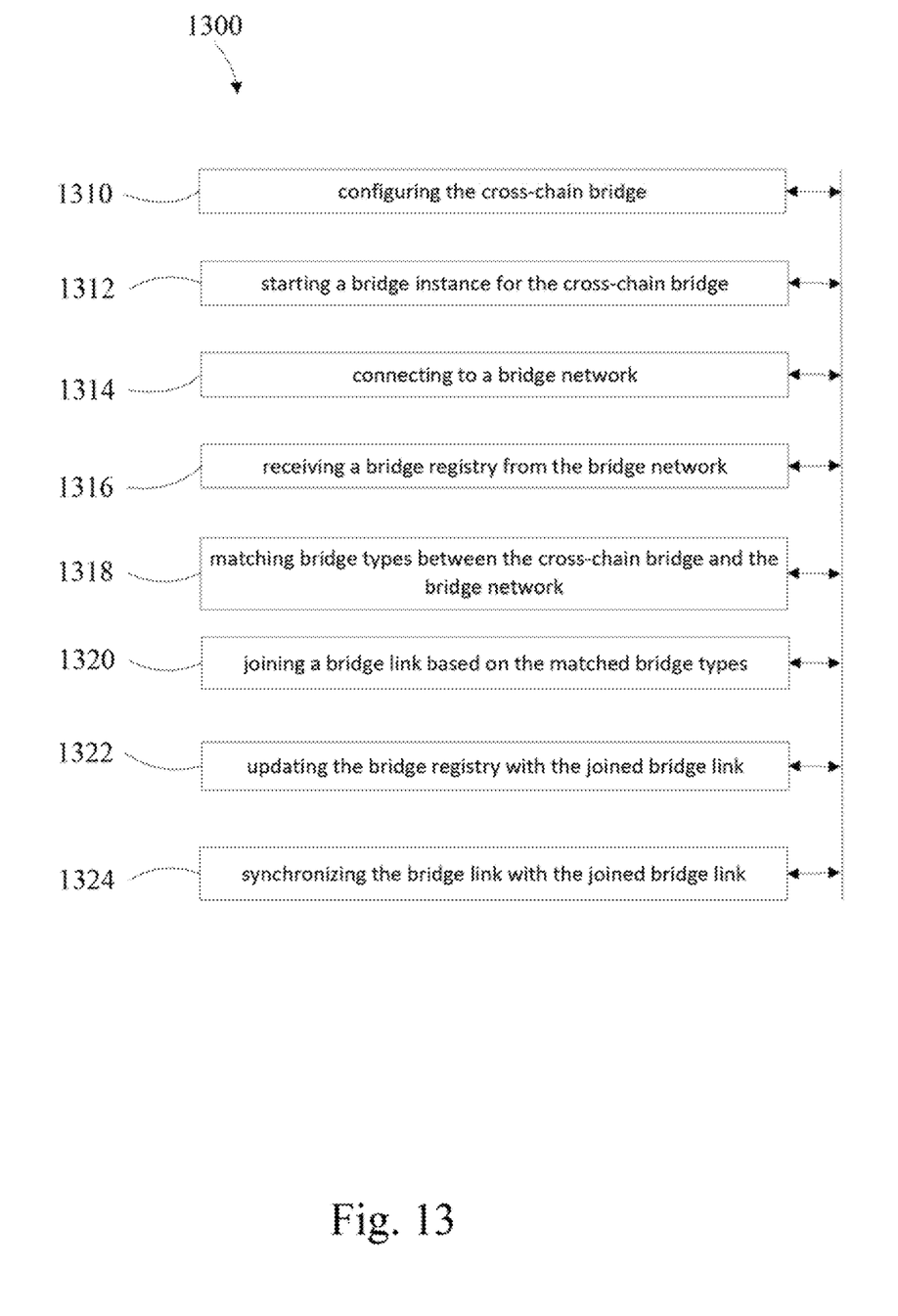
FIG. 13 is an example method of initiating a cross-chain bridge in accordance with one embodiment of the disclosure.

FIG. 13 depicts an example method of initiating a cross-chain bridge of FIG. 9, including configuring 1310 the cross-chain bridge, starting 1312 a bridge instance for the cross-chain bridge and connecting 1314 to a bridge network. The method also includes receiving 1316 a bridge registry from the bridge network, matching 1318 bridge types between the cross-chain bridge and the bridge network, joining 1320 a bridge link based on the matched bridge types, updating 1322 the bridge registry with the joined bridge link and synchronizing 1324 the bridge link with the joined bridge link.

With the advancement of public and private blockchains, the importance of interoperability increases and there is more demand for using universal cross-chain bridges to connect homogenous and heterogeneous blockchains. The disclosed method and system for using generic bridges to connect blockchains and using bridge links and multi-bridge consensus provides connecting isolated blockchains together and achieve interoperability for assets, value, data, and operations.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged, and in various examples the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

References to "one embodiment," "an embodiment," "some embodiments," "various embodiments", or the like indicate that a particular element or characteristic is included in at least one embodiment of the invention. Although the phrases may appear in various places, the phrases do not necessarily refer to the same embodiment. In conjunction with the present disclosure, those skilled in the art will be able to design and incorporate any one of the variety of mechanisms suitable for accomplishing the above described functionalities.

It is to be understood that the disclosure teaches just one example of the illustrative embodiment and that many variations of the invention may easily be devised by those skilled in the art after reading this disclosure and that the scope of then present invention is to be determined by the following claims.

What is claimed is:

1. A method of blockchain cross-chain transaction, comprising:
constructing a generic transaction payload based on collected user input;
sending the generic transaction payload to an API gateway;
checking a generic transaction payload type to determine if it is one of a cross-chain transaction and a native transaction;
receiving a bridge link if the generic transaction payload type is the cross-chain transaction;
sending the cross-chain transaction to the bridge link;
processing the cross-chain transaction;
parsing a blockchain id if the generic transaction payload type is the native transaction;
identifying a running blockchain node of the parsed blockchain id; and
sending the native transaction to blockchain to execute at least one of an on-chain transfer, an on-change exchange and an on-chain operation;
wherein processing the cross-chain transaction further comprising:
receiving by a bridge a cross-chain transaction;
parsing the cross-chain transaction;
validating the cross-chain transaction based on a simulation of the cross-chain transaction;
marking a cross-transaction error if the validation of the cross-chain transaction fails;
sending a next cross-chain transaction after marking the cross-transaction error;
synchronizing a bridge link registry with at least one other bridge if the validation of the cross-chain transaction passes;
checking a status of the cross-chain transaction in the bridge link registry;
locking the cross-chain transaction if the bridge link registry indicates that the cross-chain transaction is not in the bridge link registry;
marking a cross-chain transaction confirmation in the bridge link registry;
receiving a next cross-chain transaction after marking the cross-transaction confirmation;
sending a cross-chain transaction lock request if the cross-chain transaction is in the bridge link registry;
checking the cross-chain transaction status of the cross-chain transaction lock request in the bridge link registry;
marking the cross-chain transaction as locked if the cross-chain transaction status passes;
processing the locked cross-chain transaction; and
marking the cross-chain transaction as lock pending if the cross-chain transaction status fails.

2. The method of blockchain cross-chain transaction of claim 1 wherein the generic transaction payload includes at least one of a source blockchain id and a destination blockchain id.

3. The method of blockchain cross-chain transaction of claim 1 wherein the generic transaction payload includes respective account addresses of at least one of a source blockchain id and a destination blockchain id.

4. The method of blockchain cross-chain transaction of claim 1 wherein the generic transaction payload includes gas fees of at least one of a source blockchain id and a destination blockchain id.

5. The method of blockchain cross-chain transaction of claim 1 wherein the generic transaction payload includes a bridge link identifier.

6. The method of blockchain cross-chain transaction of claim 1 wherein the generic transaction payload includes a transaction type.

7. The method of blockchain cross-chain transaction of claim 1 wherein the generic transaction payload includes an operation type.

8. The method of blockchain cross-chain transaction of claim 1 wherein the parsed cross-chain transaction includes a blockchain id.

9. The method of blockchain cross-chain transaction of claim 1 wherein the parsed cross-chain transaction includes accounting information.

10. The method of blockchain cross-chain transaction of claim 1 wherein the parsed cross-chain transaction includes balance information.

11. The method of blockchain cross-chain transaction of claim 1 wherein the parsed cross-chain transaction includes transaction fees.

12. The method of blockchain cross-chain transaction of claim 1 further comprising sending a notification if the validation of the cross-chain transaction fails.

13. The method of blockchain cross-chain transaction of claim 1, further comprising:
configuring a cross-chain bridge;
starting a bridge instance for the cross-chain bridge;
connecting to a bridge network;
receiving a bridge registry from the bridge network;
matching bridge types between the cross-chain bridge and the bridge network;
joining a bridge link based on the matched bridge types;
updating the bridge registry with the joined bridge link; and
synchronizing the bridge link with the joined bridge link.

14. The method of blockchain cross-chain transaction of claim 13, further comprising configuring two or more bridge ports.

15. The method of blockchain cross-chain transaction of claim 13, further comprising configuring an inter-bridge consensus.

16. The method of blockchain cross-chain transaction of claim 13, further comprising configuring a bridge id.

17. The method of blockchain cross-chain transaction of claim 13, further comprising configuring a set of cross-chain parameters.

18. The method of blockchain cross-chain transaction of claim 13, further comprising allowing a user to deposit virtual currency to an account and use it for staking and receiving a reward based on cross-chain transactions.

19. The method of blockchain cross-chain transaction of claim 13, further comprising allowing a user to designate a bridge the cross-chain transactions.

* * * * *